Patented Dec. 23, 1924.

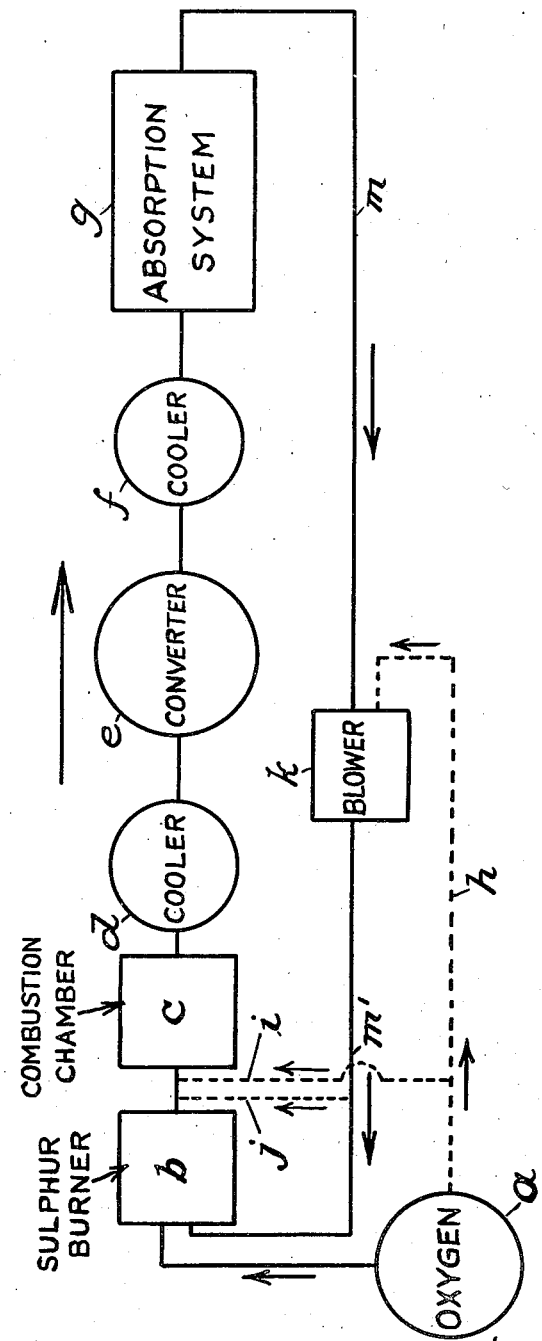

1,520,093

UNITED STATES PATENT OFFICE.

JAMES H. SHAPLEIGH, OF DOVER, NEW JERSEY, ASSIGNOR TO HERCULES POWDER COMPANY, OF WILMINGTON, DELAWARE, A CORPORATION OF DELAWARE.

PROCESS OF MAKING SULPHURIC ACID.

Application filed October 13, 1923. Serial No. 668,278.

*To all whom it may concern:*

Be it known that I, JAMES H. SHAPLEIGH, a citizen of the United States, residing at Dover, county of Morris, and State of New Jersey, have invented a new and useful Improvement in Processes of Making Sulphuric Acid, of which the following is a full, clear, and exact description, reference being had to the accompanying drawings, which form a part of this specification.

In the manufacture of sulphuric acid by the catalytic process, wherein air is used to furnish the necessary oxygen, there are many items of expense and loss which, if they could be avoided, would result in great economy. Thus, it is well recognized that while conversion of the larger part of the $SO_2$ to $SO_3$ may be readily accomplished, the conversion of the larger part of the remaining $SO_2$ is much more difficult. Frequently, therefore, two converters are arranged in series, in the first of which about eighty per cent of the $SO_2$ is converted, while in the second of which the larger part of the remainder is converted. The second converter requires the use of several times as much platinum as is necessary for use in the first converter. In case a single converter is used, it necessarily contains as much platinum as would be contained in two converters arranged in series. However, complete conversion is not practicable and a certain amount of $SO_2$, together with some oxygen and the inert nitrogen, escapes through the stack beyond the absorption system and is lost. The loss of sulfur is material, although not great; but the larger amount of platinum required for conversion, and the loss in efficiency of the platinum, with the resultant expense of replenishment, especially in the second converter, are serious factors of expense.

The percentage of sulfur dioxid entering the converter to the total volume of gases is necessarily very small. If it were possible to use just enough atmospheric air to furnish the oxygen required to combine with sulfur to form $SO_2$ and to combine with $SO_2$ to form $SO_3$ and leave no residual oxygen in the system, it is clear (there being about 21 parts of oxygen to seventy-nine parts of nitrogen in atmospheric air) that not over fourteen per cent by volume of the gases passing to the converter would be $SO_2$; the remaining seven per cent of oxygen being required to convert to $SO_3$. Practically, however, a substantial excess of oxygen is required, and the practicable minimum percentage of $SO_2$ gas passing to the converter is much less than fourteen per cent. Ten per cent is a comparatively high practicable percentage. A large part of the installation required is therefore utilized in accommodating unutilized and unutilizable gases. Further, it is impossible, without expensive temperature regulation, to obtain in the absorption system sulphuric acid of high strength.

In the ordinary process it is advisable to take special precautions to minimize poisoning of the contact material in the converter. It would be obviously advantageous to eliminate poisons from the system or render them wholly innocuous.

In the ordinary commercial process, in order to avoid waste of fuel, special arrangements must be made, by heat exchange, to conserve the heat of combustion and the heat of conversion. It would be obviously advantageous to avoid the necessity of heat exchange if, notwithstanding, substantial waste of fuel could be avoided.

The objects of my invention are: to greatly increase the efficiency of the plant, so that with the same size of plant a much greater capacity can be secured, or, conversely, an equal capacity secured with a much smaller plant; to effect a pronounced saving in the quantity of catalytic material employed as well as to arrest its deterioration and prolong its effective life, which is of special importance where the most desirable but most expensive catalyst—platinum—is used; to prevent "exit losses"; to permit of a great increase in the percentage of $SO_2$ gases to the total volume of gases entering the converter; to permit of the production of a much stronger acid than is produced in the ordinary contact and absorption process; to avoid the use of heat exchangers or at least dispense with the necessity for their use to secure economical operation; to dispense with the necessity of temperature control to render poisons inactive; to render it practicable and economical to use a single converter without attempting to convert therein more than about eighty per cent of the incoming $SO_2$ and still avoid waste of the remainder or any part thereof; to reduce power consumption and provide a system operating under a flexible condition of pressure.

One of the features of my present process is the use of oxygen instead of atmospheric air. It should be understood, however, that no claim of novelty of patentability is made for the use of oxygen, per se, instead of atmospheric air. If oxygen were obtainable at a slight expense, it is clear that it would be used as a matter of course, in the present system, whereby certain of the disadvantages above enumerated that are characteristic of the usual process would be overcome in some degree. However, the fact that oxygen is not employed in the generally used commercial process is sufficient evidence that the expense of its manufacture, even with modern and improved methods, outweighs its palpable advantages. My invention, however, consists in a special method of utilizing oxygen, whereby its expense of production is outweighted by the economies effected. My process involves avoidance of waste of oxygen and avoidance of loss of sulfur dioxid and sulfur trioxid, while at the same time dispensing with the necessity of converting that substantial proportion of sulfur dioxid (say twenty per cent) whose conversion is most difficult and uneconomical. In fact, my process secures all the objects and advantages hereinbefore enumerated.

In carrying out my process, I effect combustion of the sulfur, which may be pure sulfur, or even pyrites, by means of dry oxygen. Chemically pure oxygen would, of course, be a desideratum, but would be uneconomical and is wholly unnecessary, a reasonable degree of dilution being quite permissible. It will, therefore, be understood that where, in the claims, I specify oxygen substantially undiluted with inert gases, I do not mean to exclude oxygen that has mixed with it a very small proportion of inert gases, as distinguished from chemically pure oxygen. Very dry sulfur is preferably used, and to this end it may, if desired, be liquefied. Preferably, a substantial excess of oxygen required for combustion and conversion should be employed, say about two-thirds more than is theoretically required, so that the $SO_2$ gases entering the converter from the burner will be about forty per cent of the total gases passing to the converter. Twenty per cent of the original oxygen will be required to convert this volume of $SO_2$ to $SO_3$, while forty per cent of the original oxygen will pass out of the converter. In fact, however, no attempt is made to secure a quantitative conversion, so that considerably more than forty per cent of the total oxygen will flow out the converter with the sulfur trioxid and unconverted sulfur dioxid.

Between the burner and the converter I interpose the usual cooler. There is no occasion, in this cooler, to reduce the temperature below the conversion temperature (say 400° C.), if pure dry sulfur or Louisiana brimstone is used to produce the sulfur dioxid, because, without the use of atmospheric air, or other conditions producing moisture, there is no suspended mist produced, and there is no occasion to reduce the temperature to the point required to precipitate the mist and thereby eliminate or render inactive the impurities carried thereby. Temperature control of any kind is thereby rendered wholly unnecessary except for the purpose of securing the temperature required for conversion. My process, however, does not exclude the reduction of the temperature below that required for conversion, where the source of sulfur is such that poisons are produced that can only be eliminated or rendered inactive by cooling below the conversion temperature.

The $SO_2$ gases and oxygen not used in combustion pass, as above explained, from the cooler to the converter, which may be of any approved type. Preferably, platinum is employed as a catalyst, either in the form of platinized asbestos or platinized magnesium sulfate or other soluble salts. Iron oxide, however, is an effective catalytic agent, especially in my process. In the ordinary process, two converters are employed in series, in the first of which about eighty per cent of the gases are rather easily converted, while in the second or variable proportion of the remainder, say from fifteen to eighteen per cent of the entire original volume, are converted. The incomplete conversion of this smaller residue is a very expensive factor in the ordinary process, because so difficult is it to effect conversion of this substantial residue that about four times as much platinum is employed in the second converter as in the first. In my process, however, I dispense with the second converter and make no attempt to secure even an approximately complete conversion in the single converter that I preferably employ. The degree of completeness of conversion in the single converter will vary, within limits, with the amount of contact material, and some degree of latitude must be left to the judgment of those who practice the process. Only a substantially incomplete conversion, however, would probably be economical, and eighty per cent is given as an example, as distinguished from the almost complete conversion which it is aimed to secure in the ordinary process and which is sometimes attained.

The mixture of $SO_3$ gas, $SO_2$ gas and oxygen leaving the converter then passes through one or more coolers and then through the absorption system, where the $SO_3$ is absorbed. The remaining gases, consisting almost wholly of oxygen and $SO_2$, then pass to a blower that forces these gases back into the system at a point behind the converter and preferably directly into the sulfur burner. In fact, it is desirable to utilize this unused oxygen to supply a large proportion of the oxygen required for the combustion of the sulfur, the remainder of the oxygen, if any, required for this purpose and that required for supplying the system with the desired excess oxygen being introduced from the source of supply, which may be stored in tanks or may be manufactured on the premises and used as required. Any means other than a blower may be used for creating the forced current required to reintroduce into the system the gases passing from the absorption apparatus, or (more accurately speaking) maintain a continuous circulation of gases in the closed circuit. The oxygen from the outside source of supply may be introduced into the system behind the blower, if a blower be used, so that the fresh oxygen, the unused oxygen that has already passed through the system, and the sulfur dioxid may all pass together into the burner; or the oxygen from the outside source of supply may be admitted directly into the burner; or only sufficient oxygen from either or both sources to effect combustion may be admitted direct to the burner, the remainder being introduced between the burner and the first cooler.

By means of the closed system described, there are no losses. Thereby all the advantages and savings hereinbefore enumerated are secured. Incomplete conversion in a single converter involves no loss of either sulfur or oxygen. Any desired excess of oxygen may be used without waste. The desideratum is secured of having a very large proportion of $SO_2$ in the gases passing to the converter, as distinguished from the low proportion of eight or ten per cent that is attainable in the usual process. Comparatively little platinum is required to effect incomplete conversion, and poisoning of the catalyst is minimized if not eliminated. The apparatus need not be complicated by the use of heat exchangers, although their employment is not necessarily excluded.

Inasmuch as in the processes for producing commercial oxygen, such as the liquefaction processes, certain foreign gases, such as nitrogen and argon, are present, in small amount, in the resultant product, it will be advisable, from time to time, to blow out the system with oxygen or $SO_2$ gas to deplete the enclosed system of these foreign gases.

The sulfur burner should be of a special type adapted to resist oxidation. It should be provided with entirely closed ends, except for connections provided at the end for admission of gases and sulfur.

The combustion chamber and coolers may be of any standard type. To eliminate the effects of high heat generation, the converter is preferably of the small tube type, wherein heat losses may be around the individual tubes.

The power necessary for circulation may be supplied from an electric current, or it may be obtained by the operation of an engine with high pressure oxygen expanding and exhausting direct to the system.

The system being closed, the effect of contraction in volume, due to absorption of $SO_3$ in sulphuric acid, may be utilized to give a flexible means of operating under either a positive or negative pressure throughout the system. In the former case, the pressure may be supplied by the entering oxygen.

The drawing is a diagram of a system in which my improved process may be carried out; it being understood, from the foregoing description, that this arrangement is susceptible of considerable variation.

Oxygen and sulfur dioxid are blown through pipe $m$, $m'$, by means of blower $k$, into the sulfur burner $b$, into which is also forced oxygen from the supply $a$. $c$ is the combustion chamber. $d$ is the cooler for reducing the temperature of the oxygen and $SO_2$ gases coming from the burner. $e$ is the converter. $f$ is the cooler for reducing the oxygen and the $SO_3$ and unconverted $SO_2$ gases to the absorption temperature. $g$ is the absorption system for absorbing $SO_3$ in sulphuric acid. The pipe $h$ provides for admission of some or all of the oxygen from the source of supply into the system behind the blower. If the oxygen is introduced by an injector into the system at this point, a blower may be dispensed with. $i$ and $j$ indicate pipes through which oxygen from the source of supply, and mixed oxygen and sulfur dioxid, respectively, may be admitted to the closed system beyond the burner and back of the combustion chamber.

Where in the claims I specify oxygen substantially undiluted with nitrogen, I do not mean to be restricted to chemically pure oxygen, but intend to be understood as including commercial oxygen, even though it contains such foreign gases as would be present in the final product in the manufacture of the same on a commercial scale.

Having now fully described my invention, what I claim and desire to protect by Letters Patent is:

1. The process of making sulphuric acid which comprises effecting the combustion of sulfur with oxygen substantially undiluted with inert gases, subjecting the resultant sulfur dioxid to catalytic action to effect conversion of sulfur dioxid to sulfur trioxid while passing through the converter oxygen in process of that utilized in such conversion, whereby a substantial amount of oxygen passes with the sulfur trioxid from the converter, absorbing the sulfur trioxid from the mixture of the same unconverted oxygen and any unconverted sulfur dioxid and again subjecting the unconverted and unabsorbed gases to said catalytic action.

2. The process of making sulphuric acid which comprises effecting the combustion of sulfur with oxygen substantially undiluted with inert gases, subjecting the resultant sulfur dioxid to catalytic action to effect a substantially incomplete conversion of sulfur dioxid to sulfur trioxid while passing through the converter oxygen substantially in excess of that utilized in such conversion, whereby substantial amounts of unconverted sulfur dioxid and oxygen pass with the sulfur trioxide from the converter, absorbing the sulfur trioxid from the mixture of the same with unconverted sulfur dioxid and oxygen, and again subjecting the unconverted and unabsorbed sulfur dioxid and oxygen to said catalytic action.

3. The process of making sulphuric acid which comprises effecting the combustion of sulfur with oxygen substantially undiluted with inert gases, subjecting the resultant sulfur dioxid to catalytic action to effect a substantially incomplete conversion of sulfur dioxid to sulfur trioxid while passing through the converter oxygen substantially greater than that required for complete conversion of sulfur dioxid to sulfur trioxid, whereby a substantial proportion of unconverted sulfur dioxid and a substantially greater proportion of oxygen pass with the sulfur trioxid from the converter, absorbing the sulfur trioxid from the mixture of the same with unconverted sulfur dioxid and oxygen, and again subjecting the unconverted and unabsorbed sulfur dioxid and oxygen to said catalytic action.

4. The process of making sulphuric acid which comprises subjecting a mixture of sulfur dioxid and oxygen substantially undiluted with nitrogen to catalytic action adapted to effect an incomplete conversion of sulfur dioxid to sulfur trioxid, absorbing the sulfur trioxid from the mixture of the same with unconverted sulfur dioxid and oxygen, and utilizing said oxygen and oxygen substantially undiluted with nitrogen from an outside source for the combustion of sulfur to form fresh sulfur dioxid and for effecting, by such catalytic action, the incomplete conversion of fresh sulfur dioxid and the said unconverted sulfur dioxid to sulfur trioxid.

5. The process of making sulphuric acid which comprises establishing a closed circuit for the passage of gases, catalytically effecting an incomplete conversion in said closed circuit of sulfur dioxid to sulfur trioxid, absorbing in said closed circuit said sulfur trioxid, and introducing into said closed circuit sufficient oxygen substantially undiluted with nitrogen to maintain an excess of oxygen at all points in the closed circuit.

6. The process of making sulphuric acid which comprises effecting the combustion of sulfur with oxygen substantially undiluted with nitrogen, establishing a closed circuit for the passage of gases, catalytically effecting an incomplete conversion in said closed circuit of the sulfur dioxid produced by said combustion to sulfur trioxid, absorbing in said closed circuit said sulfur trioxid, and utilizing the unconverted oxygen and fresh oxygen substantially undiluted with nitrogen to supply the total oxygen required to maintain combustion and supply a substantial excess of oxygen for effecting said conversion.

7. The process of making sulphuric acid which comprises effecting the combustion of sulfur with oxygen, subjecting the resultant sulfur dioxid to catalytic action to effect a substantially incomplete conversion of sulfur dioxid to sulfur trioxid while passing through the converter oxygen substantially in excess of that utilized in such conversion, whereby substantial amounts of unconverted sulfur dioxid and oxygen pass with the sulfur trioxid from the converter, absorbing the sulfur trioxid from the mixture of the same with unconverted sulfur dioxid and oxygen, again subjecting the unconverted and unabsorbed sulfur dioxid and oxygen to said catalytic action, thereby establishing a closed circuit in which substantially all the original oxygen and sulfur are ultimately converted and in which any inert gases accumulate, and at intervals depleting the circuit of all its gases.

8. The process of making sulfuric acid which comprises effecting the combustion of sulfur with oxygen substantially undiluted with inert gases; subjecting the resultant sulfur dioxid to catalytic action to effect an incomplete conversion of sulfur dioxid to sulfur trioxid while passing through the converter oxygen substantially greater in proportion than that required for complete conversion of sulfur dioxid to sulfur trioxid, with resultant high partial pressure of oxygen in the exit gases from the converter, whereby a high percentage of conversion of sulfur dioxid to sulfur trioxid is obtained and a substantial proportion of unconverted sulfur dioxid and a substantially greater proportion of oxygen passes with the sulfur trioxid from the converter; absorbing the sulfur trioxid from the mixture of the same with unconverted sulfur dioxid and oxygen;

maintaining all the unconverted gases, comprising oxygen in dominant proportion, in a gaseous condition; and again subjecting such gases to catalytic action.

9. The process of making sulphuric acid which comprises effecting the combustion of sulfur with oxygen substantially undiluted with inert gases, subjecting the resultant sulfur dioxid to catalytic action to effect an incomplete conversion of sulfur dioxid to sulfur trioxid while passing through the converter oxygen substantially greater in proportion than that required for complete conversion of sulfur dioxid to sulfur trioxid, whereby a substantial proportion of unconverted sulfur dioxid and a substantially greater proportion of oxygen pass with the sulfur trioxid from the converter, absorbing the sulfur trioxid from the mixture of the same with unconverted sulfur dioxid and oxygen, utilizing unconverted oxygen passing from the absorber, and also oxygen substantially undiluted with nitrogen from an outside source, for the combustion of sulfur to form fresh sulfur dioxid, and subjecting the unconverted newly formed sulfur dioxid and those parts of the newly introduced oxygen and of said unconverted oxygen that have not combined with sulfur to form fresh sulfur dioxid, to said catalytic action.

In testimony of which invention, I have hereunto set my hand, at Philadelphia, Penna., on this first day of October, 1923.

JAMES H. SHAPLEIGH.